(12) United States Patent
Frerich et al.

(10) Patent No.: US 7,526,365 B1
(45) Date of Patent: Apr. 28, 2009

(54) CONTINUOUS-FLOW IRRIGATION TIMER

(75) Inventors: David K. Frerich, Abernathy, TX (US); Earl T. Farley, Lubbock, TX (US)

(73) Assignee: Eco-Drip Irrigation Systems, Abernathy, TX (US)

( * ) Notice: Subject to any disclaimer, the term of this patent is extended or adjusted under 35 U.S.C. 154(b) by 141 days.

(21) Appl. No.: 11/739,658

(22) Filed: Apr. 24, 2007

Related U.S. Application Data

(60) Provisional application No. 60/745,738, filed on Apr. 26, 2006.

(51) Int. Cl.
| | |
|---|---|
| G05D 11/00 | (2006.01) |
| B05B 3/00 | (2006.01) |
| B05B 3/18 | (2006.01) |
| F16K 11/074 | (2006.01) |
| F16K 31/48 | (2006.01) |
| G05B 11/01 | (2006.01) |

(52) U.S. Cl. .................... 700/284; 700/14; 239/723; 137/624.13; 137/624.18

(58) Field of Classification Search .............. 700/11, 700/12, 14–16, 282–284, 289; 239/63, 200, 239/443, 569, 723; 137/78.2, 409, 410, 624.11, 137/624.13, 624.18, 825, 829, 832
See application file for complete search history.

(56) References Cited

U.S. PATENT DOCUMENTS

| | | | |
|---|---|---|---|
| 3,860,172 A | | 1/1975 | Platt |
| 4,032,072 A | | 6/1977 | McElhoe et al. |
| 4,226,366 A | | 10/1980 | Nortoft |
| 4,646,224 A | | 2/1987 | Ransburg et al. |
| 5,048,755 A | | 9/1991 | Dodds |
| 5,337,957 A | * | 8/1994 | Olson ................. 239/63 |
| 5,465,904 A | | 11/1995 | Vaello |
| 5,479,338 A | * | 12/1995 | Ericksen et al. ........... 700/16 |

(Continued)

FOREIGN PATENT DOCUMENTS

JP        1984 59082966        5/1984

(Continued)

*Primary Examiner*—Crystal J Barnes Bullock
(74) *Attorney, Agent, or Firm*—Howison & Arnott, L.L.P.

(57) ABSTRACT

An apparatus for controlling an irrigation system having multiple irrigation zones. The apparatus comprises a processor with associated memory, a plurality of valve controllers, an input device and a display screen. Each of the valve controllers is selectively activatable by the processor to provide a control signal to a respective zone valve, if connected thereto. The input device is adapted for inputting to the memory first data designating which of the controllers are available for activation, second data designating how many of the available controllers are to be activated simultaneously and third data designating how many times during a predetermined time period each of the available controllers will be activated. The display device is connected to the processor for displaying the first, second and third data. Initially, the processor uses the first, second and third data to select a first set containing at least two of the available controllers, to simultaneously provide control signals to all controllers in the first set, and to maintain the control signals until a new set is selected. At a regular interval thereafter, the processor uses the data to select a new set containing at least two of the available controllers, the new set including at least one controller that was not in the preceding set.

20 Claims, 5 Drawing Sheets

U.S. PATENT DOCUMENTS

| | | | |
|---|---|---|---|
| 6,003,783 A * | 12/1999 | Hunter | 239/200 |
| 6,102,061 A | 8/2000 | Addink | |
| 6,220,293 B1 | 4/2001 | Rashidi | |
| 6,227,220 B1 | 5/2001 | Addink | |
| 6,298,285 B1 * | 10/2001 | Addink et al. | 700/284 |
| 6,402,048 B1 * | 6/2002 | Collins | 239/63 |
| 6,453,215 B1 * | 9/2002 | Lavoie | 239/63 |
| 6,490,505 B1 * | 12/2002 | Simon et al. | 700/284 |
| 6,507,775 B1 | 1/2003 | Simon et al. | |
| 6,688,535 B2 * | 2/2004 | Collins | 239/63 |
| 7,203,576 B1 * | 4/2007 | Wilson et al. | 700/284 |
| 7,339,957 B2 * | 3/2008 | Hitt | 370/509 |
| 2003/0179102 A1 * | 9/2003 | Barnes | 340/870.07 |
| 2007/0044978 A1 * | 3/2007 | Cohen | 169/5 |

FOREIGN PATENT DOCUMENTS

JP      1993 05304846      11/1993

* cited by examiner

CONTINUOUS-FLOW IRRIGATION TIMER

CROSS-REFERENCE TO RELATED APPLICATIONS

This application claims priority from Provisional Application No. 60/745,738, entitled "Continuous-Flow Irrigation Timer," filed Apr. 26, 2006.

TECHNICAL FIELD

The disclosure relates to the field of irrigation timers, and more particularly to timers for use in continuous-flow applications such as drip irrigation.

BACKGROUND

The term "deficit irrigation" is used to describe the situation where all available water from a given water source is used to irrigate a given parcel of land. Frequently, the source cannot supply sufficient water volume to irrigate the entire parcel simultaneously. Under these conditions, the parcel is typically subdivided into a plurality of zones, and the water flow is periodically directed to each zone, or to combinations of zones, such that over a given period of time each zone receives an equal share of the available water.

In deficit irrigation situations, it is not unusual to use a continuous-flow irrigation system wherein the water source operates continuously. The source may be a water well powered by a gas or electric pump. The water from the source is periodically switched between irrigation zones, but it never shuts off during normal operations. If the water distribution system operates incorrectly when the source is running, an emergency shutdown of the source may be required to protect the distribution lines from overpressure and failure.

In the typical continuous-flow irrigation system, electrically-operated valves control the flow of water from a source header to the delivery lines for each zone. A programmable timer is used to operate the zone valves in a predetermined sequence to distribute the water as desired. However, prior art irrigation timers typically require the user to independently program the watering schedule for each zone by specifying start times and watering duration for each valve (or group of valves). A persistent problem with such prior art timers is the significant amount of calculations and programming input (i.e., button pushing) required to program the timer so that it runs 24 hours per day (i.e., no gaps between end and start times in successive zones) and so that it evenly distributes the water to all zones over the day. A need therefor exists, for a continuous-flow irrigation timer that controls the distribution of water between zones with a minimum of user input.

SUMMARY

As disclosed herein, in one aspect an apparatus for controlling an irrigation system having a plurality of irrigation zones includes a processor and a plurality of valve controllers. Each of the zones in the irrigation system has water distribution ducts and a zone valve for selectively providing water to the ducts in response to a control signal. The apparatus comprises a processor with associated memory and a plurality of valve controllers operatively connected to the processor. Each of the plurality of valve controllers is selectively activatable by the processor to provide a control signal to a respective zone valve, if connected thereto.

An input device is operatively connected to the processor. The input device is adapted for inputting to the associated memory first data designating which of the plurality of valve controllers are available for activation, second data designating how many of the available valve controllers are to be activated simultaneously and third data designating how many times during a predetermined time period each of the available valve controllers are to be activated. A display device is operatively connected to the processor for visually displaying information related to the first, second and third data stored in the associated memory. Initially, the processor uses the first, second and third data to select a valves-to-cycle set containing at least two of the available valve controllers from the plurality of valve controllers, to simultaneously provide control signals to all of the valve controllers in the valves-to-cycle set to activate all of the respective zone valves, and to maintain the control signals until a new valves-to-cycle set is selected. Continually at a regular interval thereafter, the processor uses the first, second and third data to select a new valves-to-cycle set containing at least two of the available valve controllers from the plurality of valve controllers and including at least one valve controller that was not included in the preceding set, to simultaneously provide control signals to all of the valve controllers in the new set to activate all of the respective zone valves, and to maintain the control signals until another new valves-to-cycle set is selected. In this manner, during a predetermined period, each of the available valve controllers is cumulatively activated for an equal amount of time.

In another aspect, an irrigation timer includes a digital processor with associated memory, a plurality of output modules and an input device. The output modules are operatively connected to the digital processor. Each output module selectively produces an output signal in response to a digital input signal received from the digital processor. The input device is operatively connected to the digital processor and adapted for inputting to the associated memory first information designating which of the plurality of output modules are available for activation, second information designating how many of the available output modules are to be activated simultaneously, and third data designating how many times during a predetermined time period each of the available output modules are to be activated. The digital processor repeatedly, at a regular interval selected using the second and third information, selects a valves-to-cycle set containing at least two of the plurality of output modules designated available for activation by the first information and including at least one output module that was not included in an immediately preceding valves-to-cycle set. The processor sends digital input signals simultaneously to all of the output modules in the valves-to-cycle set and maintains the control signals until a new valves-to-cycle set is selected (i.e., until the next interval). During a predetermined period, each of the plurality of output modules designated available for activation is cumulatively activated for an equal amount of time.

In a further aspect a method for programming an irrigation timer having a processor and associated memory, an input device and a plurality of valve controllers selectively producing an output signal in response to an input signal received from the processor is disclosed. The method comprises the following steps: inputting to the associated memory using the input device first information designating which of the plurality of output modules are available for activation, inputting to the associated memory using the input device second information designating how many of the available output modules are to be activated simultaneously and inputting to the associated memory using the input device third data designating how many times during a predetermined time period each of the available output modules are to be activated. It further comprises selecting, at a regular interval using the processor, a valves-to-cycle set containing at least two of the plurality of valve controllers designated available for activation by the first information and including at least one valve controller that was not included in an immediately preceding valves-to-cycle set, sending input signals simultaneously to all of the valve controllers in the valves-to-cycle set and maintaining the input signals until a new valves-to-cycle set is selected. In this manner, during a predetermined period, each of the plurality of valve controllers designated available for activation is cumulatively activated for an equal amount of time.

In yet another aspect, a method of programming an irrigation timer having a processor and associated memory, an input device and a plurality of valve controllers, includes selecting from a plurality of valve controllers, each of the controllers controlling a zone valve for supplying water to a zone to be irrigated, a plurality of available valve controllers for actuating the associated zone valves and storing a code in a valve status table in a memory indicating an available status for the selected valves. A number of valve controllers to be simultaneously actuated is selected along with a number of cycles in a predetermined time period that each of the available valve controllers is to be actuated to operate the associated zone valves. The number of valve controllers and the number of cycles in a predetermined time period are stored in the memory.

The processor, using preprogrammed logic, determines a cycle time for actuating a set of the available valve controllers. Successive sets of valve controllers are actuated for the cycle time, each of the sets including at least two of the available valve controllers and at least one valve controller not actuated in the previous cycle such that the available valve controllers are each actuated for an equal amount of time over the predetermined time period. In one variation, the processor utilizes the selected number of available valve controllers, the selected number of controllers to be actuated simultaneously and the selected number of cycles in a predetermined time period and preprogrammed logic to determine the cycle time.

In another aspect, the step of actuating successive sets of valve controllers for the cycle time, each of the sets including at least two of the available valve controllers and at least one valve controller not actuated in the previous cycle, includes populating a valves-to-cycle table in the memory and utilizing the table to determine each set of valve controllers to be actuated in each cycle. In this regard, populating the valves-to-cycle table comprises selecting a predetermined number of available valve controllers from the valve status table stored in the memory.

BRIEF DESCRIPTION OF THE DRAWINGS

For a more complete understanding of the disclosure, reference is now made to the following description taken in conjunction with the accompanying drawings in which.

DETAILED DESCRIPTION

Figure 1:
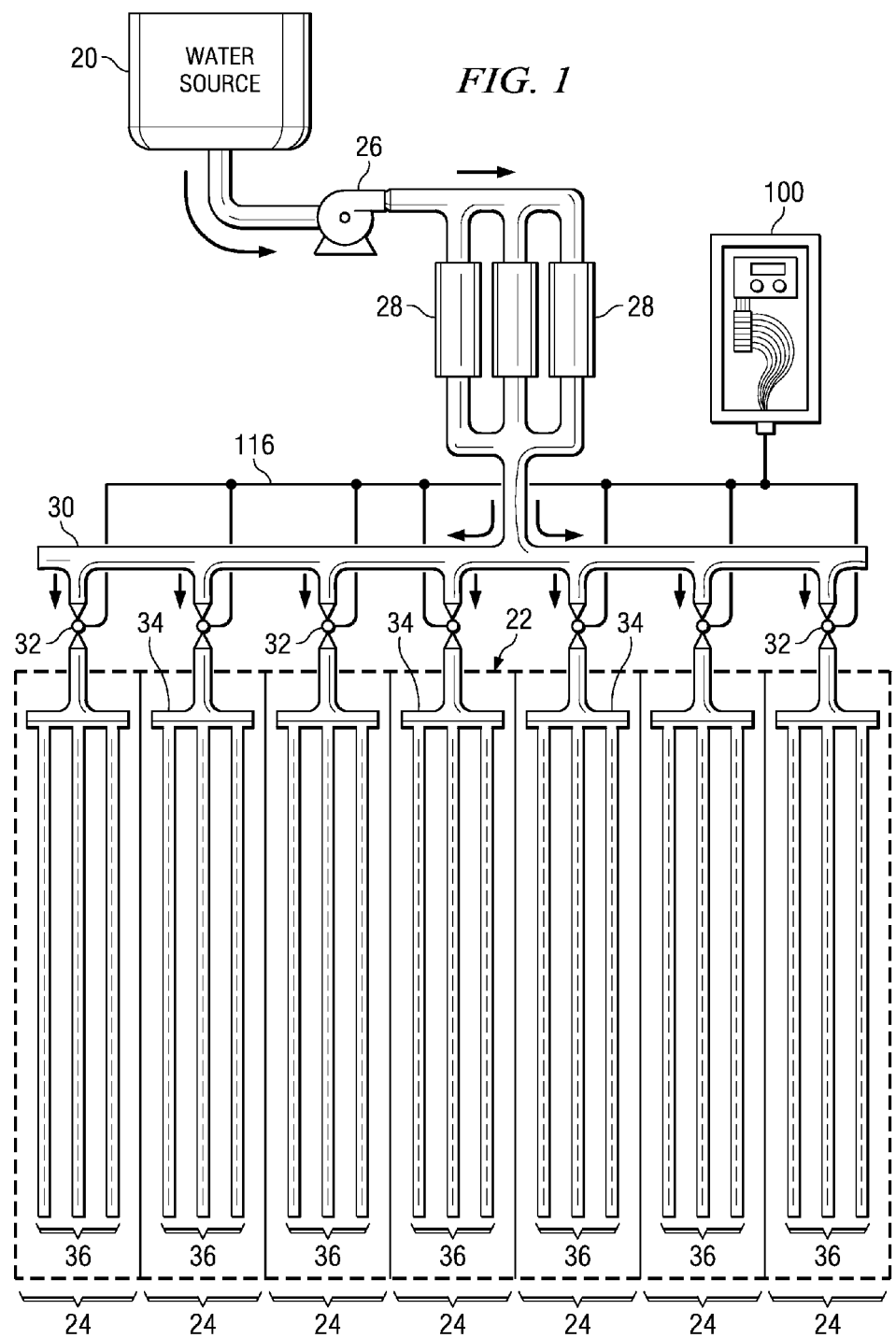
FIG. 1 shows an irrigation system including an irrigation timer in accordance with one embodiment.

Referring now to the drawings, wherein like reference numbers are used herein to designate like elements throughout the various views, embodiments of the apparatus and method are illustrated and described, and other possible embodiments are described. The figures are not necessarily drawn to scale, and in some instances the drawings have been exaggerated and/or simplified in places for illustrative purposes only. One of ordinary skill in the art will appreciate the many possible applications and variations based on the following examples.

Referring to FIG. 1, an irrigation water source 20 for a given parcel of land 22 operates continuously. The parcel of land 22 is subdivided into a plurality of zones 24, each zone having approximately the same water requirement. The water from the source 20 may be switched between irrigation zones, but it never shuts off during normal operations. In the embodiment shown, a pump 26 is used to force the water through filters 28 and into the main header 30 of the system. Electrically-operated zone valves 32 control the flow of water from a main header 30 into a zone header 34 for each zone 24. The water then flows from the zone header 34 into ducts such as drip lines 36 within each zone 24. It is desired that the water flow be periodically directed to each zone 24, or to combinations of zones, such that over a given period of time each zone receives an equal share of the available water.

A programmable timer is used to operate the zone valves 32 in a predetermined sequence to distribute the water as desired. Prior art irrigation timers typically require the user to independently program the watering schedule for each zone 24 by specifying start times and watering duration for each valve (or group of valves). A persistent problem with such prior art timers is the significant amount of calculations and programming input (i.e., button pushing) required to program the timer so that it runs 24 hours per day (i.e., no gaps between end and start times in successive zones) and so that it evenly distributes the water to all zones over the day.

Figure 2:
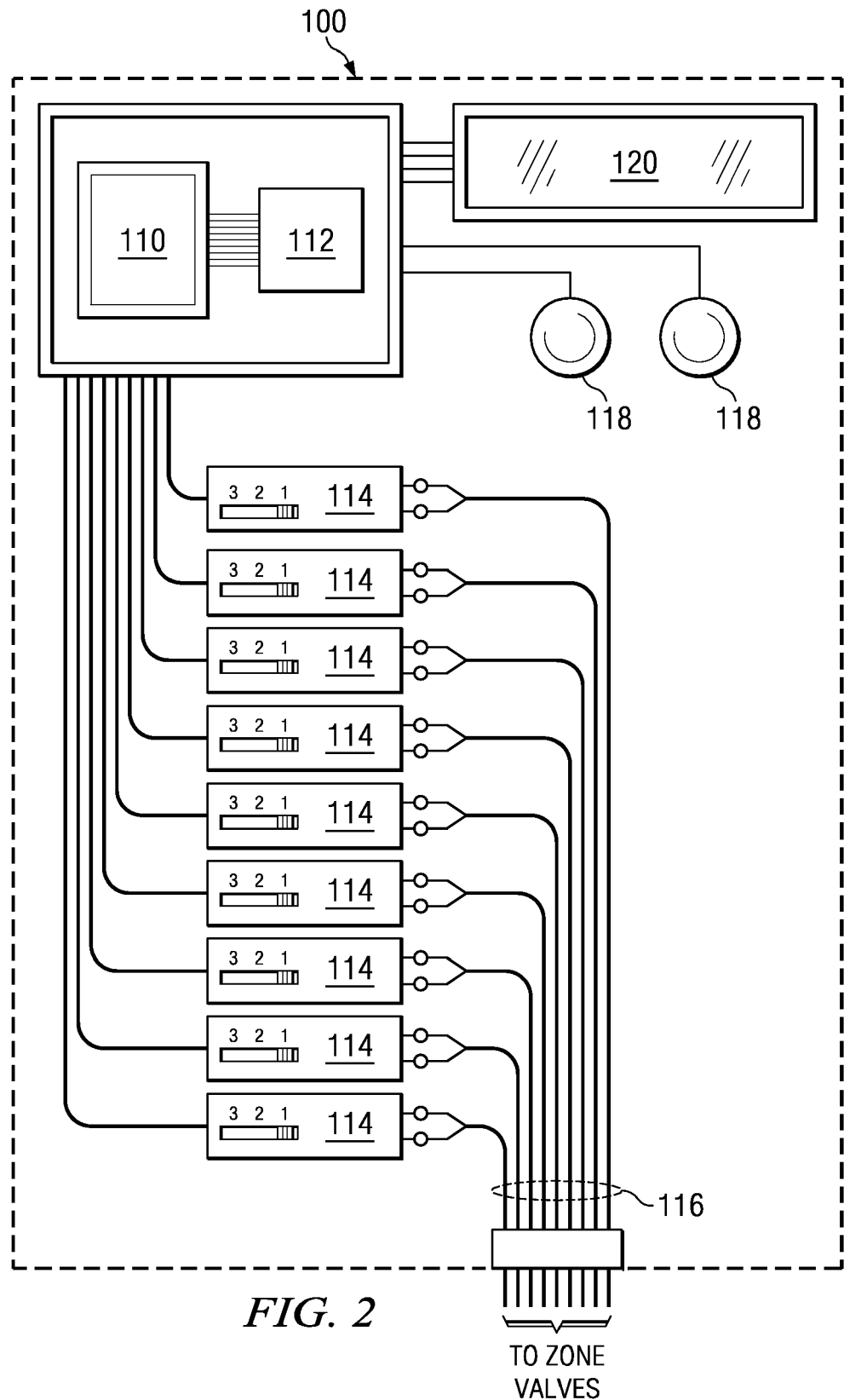
FIG. 2 is a schematic diagram of the irrigation timer of FIG. 1.

Referring to FIG. 2, a continuous-flow irrigation timer 100 is shown in accordance with one embodiment. The timer 100 is a continuous-flow irrigation timer that controls the distribution of water between multiple zones 24 without requiring separate programming for each zone, and that distributes the water evenly between multiple zones without requiring the specification of start times or durations for the zones. In some embodiments, the timer 100 controls the flow to multiple zones 24 simultaneously. The timer 100 includes a processor 110 with associated memory 112 having a plurality of memory locations. Processor 110 may be a microprocessor, microcontroller (e.g., PIC-type microcontroller), or other processors of known type. Memory 112 may be an integral portion of the processor 110 or it may comprise separate device(s) operably connected to the processor.

Figure 4:
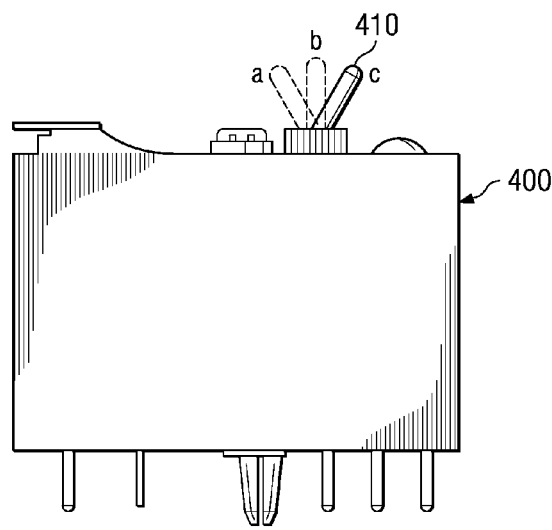
FIG. 4 is an enlarged view of an output module suitable for use in the irrigation timer of FIG. 1.

A plurality of valve control devices 114 (also called "valve controllers" or "output modules") are electrically connected to the processor 110. Valve control devices 114 may be electromechanical relays, transistors, SCRs or other such electrical switching devices. In one embodiment, valve control devices 114 are digitally controlled I/O modules such as those produced by Opto 22 of Temacula, Calif. as Model No. G4 OAC5MA (FIG. 4). Each valve control device 114 is selectively activatable by the processor 110 to operate an irrigation valve (not shown) connected by control wires 116.

One or more input devices 118 are operatively connected to the processor 110. These input device(s) 118 may be local devices such as buttons, switches, panels or the like. In the illustrated embodiment, the input device 118 consists of exactly two momentary contact pushbutton switches. In other embodiments, a remotely located control device may be operatively connected to processor 110 via a wired modem (FIG. 5A), a wireless modem (FIG. 5B), a RS232 data interface (FIG. 5C) and/or an ethernet-type network communications interface (FIG. 5D), which communicate with the processor 110 and/or the associated memory for remotely inputting data to the timer from remote locations.

The input devices 118 allow the user to store information in the memory 112 as follows:

First data or information, denoted Values X(n), designating which of the n zones 24 are to be watered (i.e., which of the n valve control devices 114 are available for activation by the processor 110);

Second data or information, denoted Value Y, designating how many zones 24 are to be watered simultaneously (i.e., how many of the available valve control devices 114 are to be activated simultaneously by processor 110); and Third data or information, denoted Value Z, designating how many times per day each zone 24 is to be watered (i.e., how many times during a predetermined time period processor 110 will activate each of the available valve control devices).

Input device 118 may also be used to designate the number of valve control devices 114 connected to processor 110 and to input a minimum voltage level for operation of timer 100. If the supply voltage drops below a predetermined value, processor 110 saves the first, second and third data and shuts down.

Timer 100 further includes a display device 120 operatively connected to processor 110 for displaying information related to Values X(n), Y and Z. In the illustrated embodiment, the display device is a multi-line LCD screen. In other embodiments, the display device may comprise LEDs, lights bulbs, audio indicators or similar devices. In still other embodiments, a remote display device may be connected to processor 110 via a remote communication device, e.g., wired modem (FIG. 5A), a wireless modem (FIG. 5B), a RS232 data interface (FIG. 5C) and/or an ethernet-type network communications interface (FIG. 5D), which communicate with the processor 110 and/or the associated memory for remotely transmitting data related to Values X(n), Y and Z from the timer to remote locations.

Figure 3A:
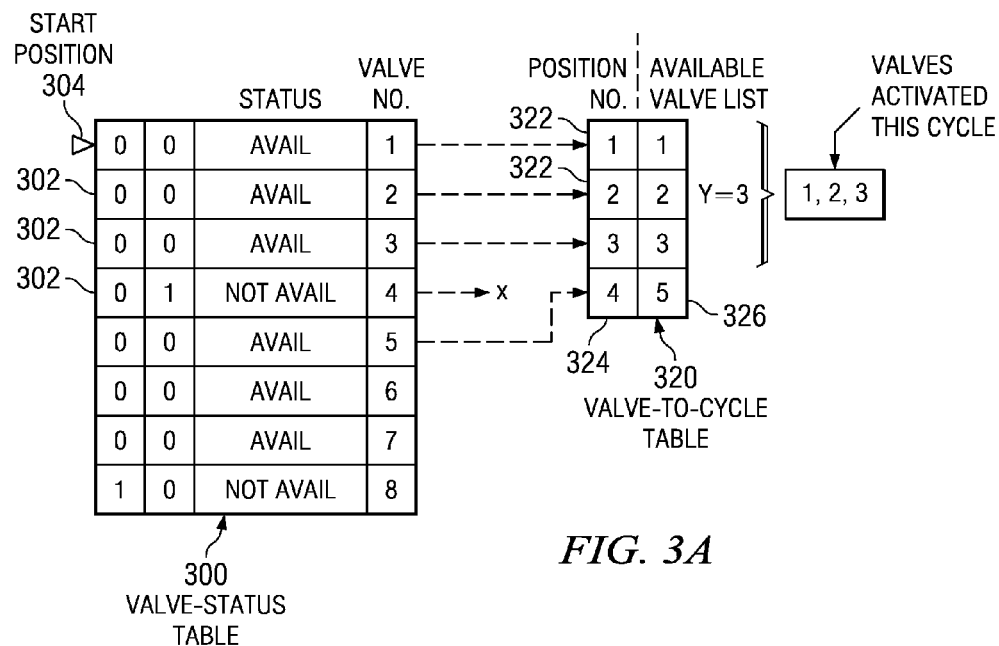
FIG. 3A illustrates the operation of an irrigation timer during one cycle in accordance with another embodiment.
Figure 3B:
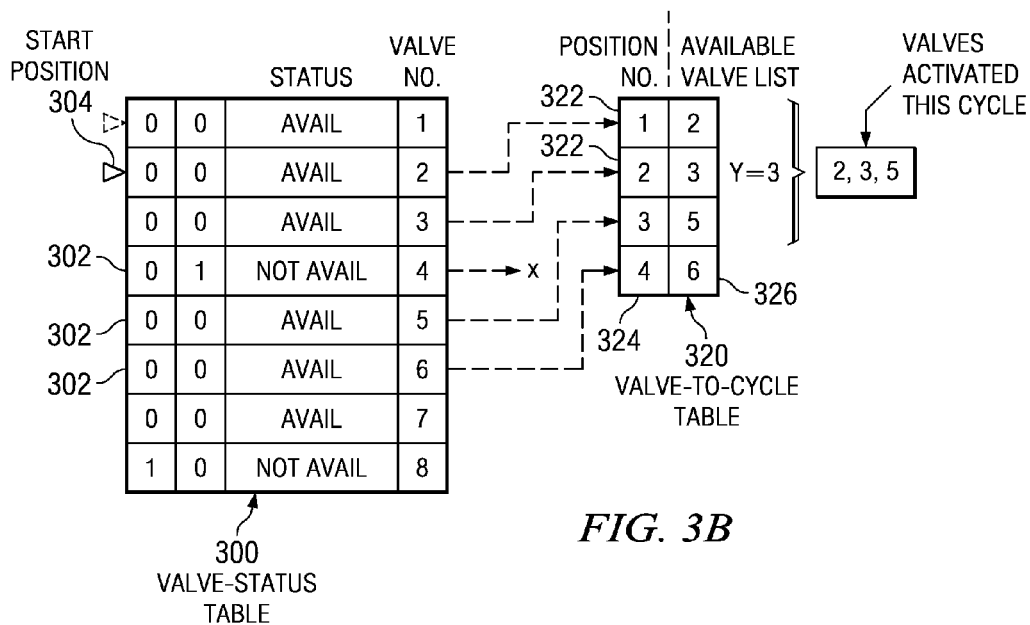
FIG. 3B illustrates the operation of the irrigation timer of FIG. 3A during another cycle.

Referring now to FIGS. 3A and 3B, operation of the timer 100 is further described. After the user has used the input device(s) 118 to store values for X(n), Y and Z in the timer memory 112, the processor 110 will determine a cycle time between valve changes. The cycle time may be determined using a lookup table or calculated using an algorithm. The significance of the cycle time will be further described below.

Located within the memory 112 is a valve-status table 300 having at least n memory locations 302 corresponding to specific valve control devices 114 (i.e., valve numbers). Each memory location 302 has at least one bit corresponding to the value of X(n) indicating the availability status of valve n. The valve-status table 300 also has a starting address denoted by pointer 304.

Also located within the memory 112 is a valves-to-cycle table 320 having m memory locations 322 corresponding to the maximum number of valve control devices 114 that can be operated simultaneously (this is a number fixed by the system). Each memory location 322 has at least one byte corresponding to the table position number 324 and one byte corresponding to an available valve number 326.

During operation, after the allotted cycle time has passed, processor 110 will initiate a valve change. At the valve change, processor 110 increments the starting address 304 of the valve-status table 300. Then, beginning at the starting address, it sequentially uses the contents of the valve-status table 300 to populate the valves-to-cycle table 320 with numbers for available valves. Then, using value Y, the first Y available valves are activated until the next valve change. At the next valve change, this cycle is repeated.

For example, in FIG. 3A, the valve-status table 300 indicates that valves 1, 2, 3, 5, 6 and 7 are available. The pointer 304 is at the first address. The valves-to-cycle table 320 has four memory locations 322, therefore, m=4 in this example. The first m valves from the pointer, namely valves 1, 2, 3 and 5, are used to populate the valves-to-cycle table 320. Next, assuming Y=3, the first three valves in the valves-to-cycle table 320 are activated until the next valve change. Thus, zones 1, 2 and 3 will receive water this cycle.

Next, in FIG. 3B, the status after the next valve change is shown. The valve-status table 300 still indicates that valves 1, 2, 3, 5, 6 and 7 are available. However, pointer 304 has incremented to the next address. The first m valves from the pointer, now valves 2, 3, 5 and 6, are used to populate the valves-to-cycle table 320. Next, with Y still=3, the first three valves in the valves-to-cycle table 320 are activated until the next valve change. Thus zones 2, 3 and 5 will receive water this cycle. By repeating this pattern, three zones will be simultaneously watered each cycle, and all of the zones 24 will receive equal water over a predetermined period such as 24 hours.

FIG. 4 is an enlarged view of an output module (i.e., valve controller) suitable for use in the irrigation timer of FIG. 1. The module 400 is a digitally controlled I/O module such as those produced by Opto 22 of Temacula, Calif. as Model No. G4 OAC5MA. The module 400 receives DC (5 V nominal) digital control signals from processor 110, and sends output control signals which are AC (120V nominal). Other types of controllers may be used, both AC and DC, and this example is not limiting. The module 400 further comprises an over-ride switch 410 having a first, "on" position (denoted a) activating the control signal regardless of inputs received from processor 110, a second, "off" position (denoted b) deactivating the control signal regardless of inputs received from the processor 110, and a third, "auto" position (denoted c) allowing the processor to selectively activate and deactivate the control signal. Switches 410 enable a user to turn the valve control device 114 for a given zone 24 on or off for inspection and maintenance without the need to interfere with the overall operation or programming of timer 100.

Figure 5A:
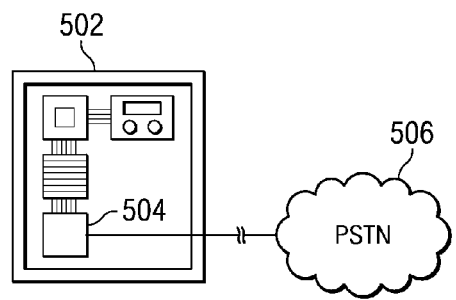
FIG. 5A illustrates a timer incorporating a wired modem for remote activation in accordance with another embodiment.

FIG. 5A illustrates a timer 502, similar to the timer 100 previously described, but including a wired modem 504 for remote activation via a Public Switched Telephone Network (PSTN) 506 in accordance with another embodiment.

Figure 5B:
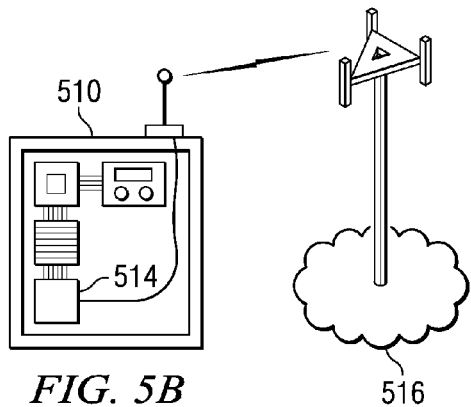
FIG. 5B illustrates a timer incorporating a wireless modem for remote activation in accordance with another embodiment.

FIG. 5B illustrates a timer 510, similar to the timer 100 previously described, but including a wireless modem 514 for remote activation via a public cellular telephone network (PLMN) 516 in accordance with another embodiment.

Figure 5C:
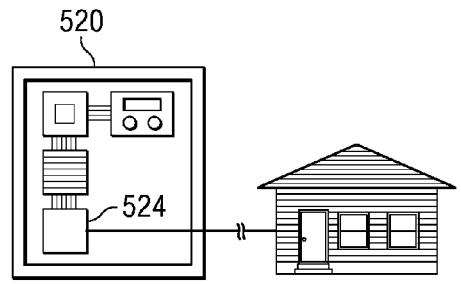
FIG. 5C illustrates a timer incorporating a RS232 data interface for remote activation in accordance with another embodiment.

FIG. 5C illustrates a timer 520, similar to the timer 100 previously described, but including a RS232 data interface 524 for remote activation in accordance with another embodiment.

Figure 5D:
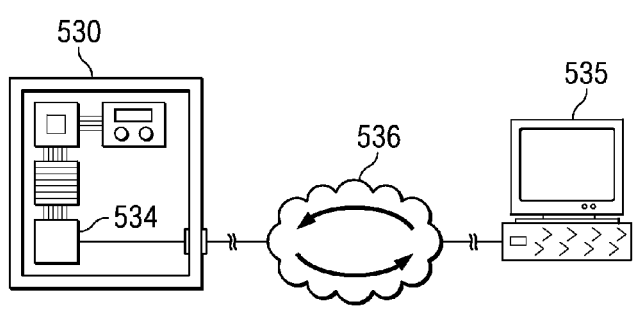
FIG. 5D illustrates a timer incorporating an ethernet-type network interface for remote activation in accordance with another embodiment.

FIG. 5D illustrates a timer 530, similar to the timer 100 previously described, but including an ethernet-type network interface 534 for remote activation from a remote location 535 via a global network 536, for example, the Internet.

Figure 6:
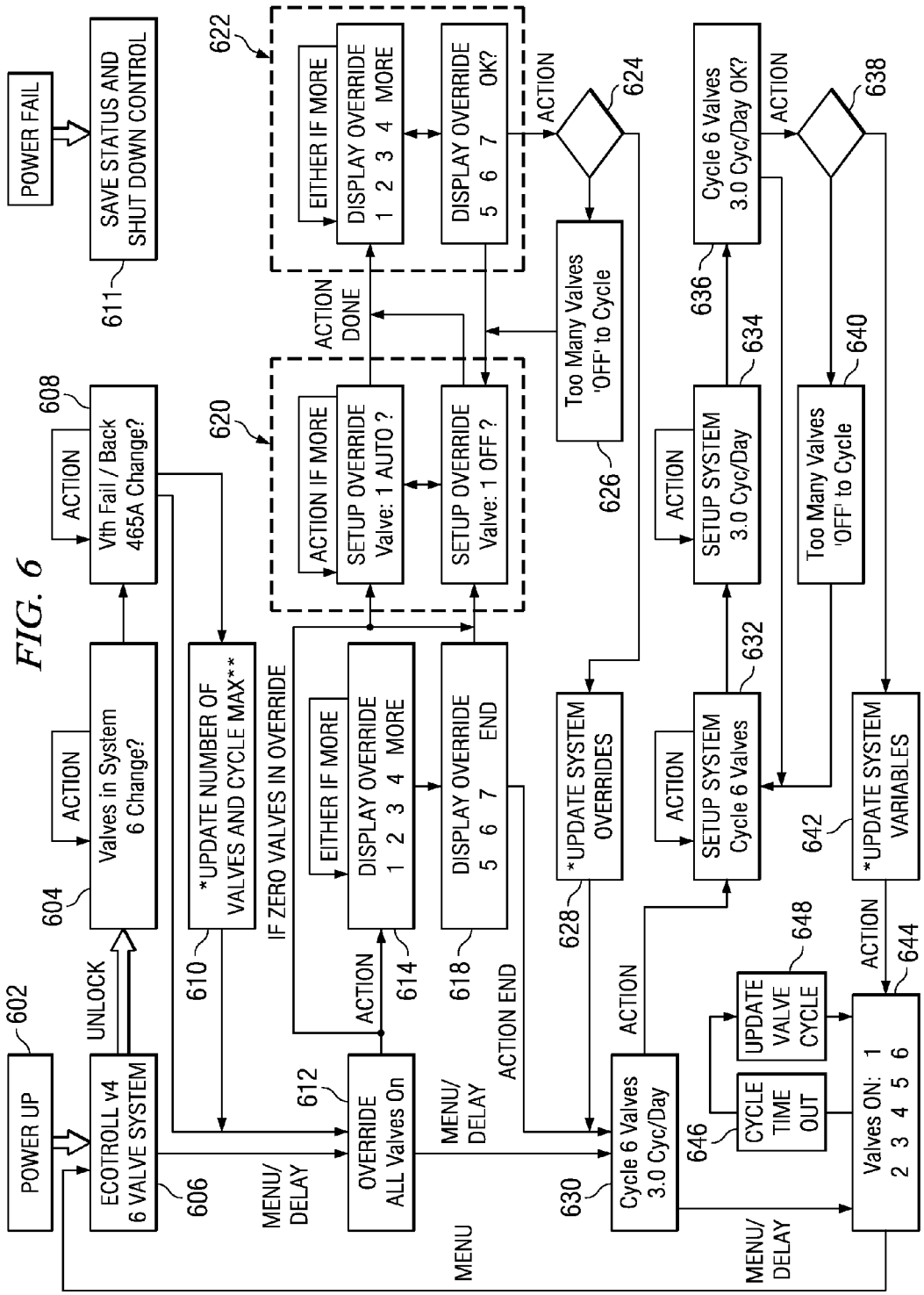
FIG. 6 is a block diagram illustrating a method programming an irrigation timer in accordance with yet another embodiment.

FIG. 6 is a block diagram illustrating a method of programming irrigation timer 100. When power is supplied to timer 100 at step 602, a message identifying the system is shown on display 120 at 606 and a first preprogrammed delay is initiated. In the illustrated embodiment, the identification message "ECOTROLL v4 6 VALVE SYSTEM" is displayed during the delay. During the initial setup, the user enters a code by means of input devices 118 to "unlock" timer 100 in order to set the number of valve control devices 114 and a minimum operating voltage level. For example, in an embodiment where input devices 118 are pushbutton contact switches, the user may push the switches in a predetermined sequence. After the timer is "unlocked," the prompt "Valves in System 6 Change?" is displayed (step 604) and the user is given the option of changing the number of valve control devices 114. The user sets the number of valve control devices 114 and confirms the change using input devices 118.

Next, a prompt (Vth Fail/Back 465A Change?) is displayed (step 608), prompting the user to enter a predetermined minimum voltage for operation using input devices 118. If the voltage level falls below the predetermined minimum value during operation, processor 110 saves the programmed settings and status and shuts down at (step 611). Normally the number of valve control devices 114 and the minimum voltage level are preset or initially set for the particular timer and/or application and not subsequently changed. After the predetermined minimum voltage has been set, processor 110 updates the number of valve control devices 114 and the maximum cycle time based on the number of valve controllers in memory 112 (step 610) and moves to the override display (step 612).

Referring back to step 602, during normal use after the identification message is displayed and the first preprogrammed delay elapses, the override status of valve control devices 114 is displayed (step 612) and a second preprogrammed delay is initiated. During the delay, the user may use an input device 118 to move to "DISPLAY OVERRIDE" (step 614) and then to "SETUP OVERRIDE" (step 620). If none of valve control devices 114 have previously been overridden, the "DISPLAY OVERRIDE" prompt is bypassed and the "SETUP OVERRIDE" prompt is displayed.

From the "DISPLAY OVERRIDE" (step 614) prompt, using input devices 118, the user may then proceed to "DISPLAY OVERRIDE END" (step 618) without changing the settings. Alternatively, the user may proceed to "SETUP OVERRIDE" (step 620) to change and confirm the override status of one or more of valve control devices 114. At step 620, the user is prompted to set the status of each valve control device. Depending upon whether a particular valve control device has been previously set to "Auto" or "Off," one of two prompts will query the user as to whether the status of the control device should be changed. After the user has set the status of valve control devices 114, the status of the valves is displayed (step 622). The user may then use input devices 118 to return to "SETUP OVERRIDE" (step 620) or confirm the setting. Those valves selected for override status are indicated as "unavailable" in valve status valve-status table 300.

At step 624 the number of valve control devices 114 available (not overridden) is compared to the preprogrammed number of valve control devices to be cycled. If the number of valve control devices 114 overridden is greater than the preprogrammed number of valve control devices to be cycled, the "Too Many Valves 'OFF' to Cycle" message is displayed (step 626) and the program loops back to the "SETUP OVERRIDE" (step 620) to enable the user to reset the number of valve control devices 114 to be overridden. Otherwise, the override status of valve control devices 114 is updated in memory 112 (step 628) and the program advances to the setup display (step 630). Those valve controllers not overridden correspond to the first data or information, denoted Values X(n), designating which of n zones 24 are to be watered.

The previously programmed number of valve control devices 114 to be simultaneously cycled and the number of cycles per day are displayed at step 630 and a third preprogrammed delay is initiated. In the illustrated embodiment, the preprogrammed setting "Cycle 6 Valves 3.0 Cyc/Day" is shown, indicating that 6 valve control devices 114 (corresponding to six zones 24) are to be cycled simultaneously and that each valve control device is to be cycled 3 times per day. During the delay the user may use input device 118 to move to a first "SETUP SYSTEM" prompt (step 632) and select the number of valve control devices 114 to be simultaneously cycled. The number of valve control devices 114 to be cycled simultaneously corresponds to the second data or information, denoted Value Y, designating how many zones 24 are to be watered simultaneously.

After the number of valve control devices 114 to be simultaneously cycled is selected, a second "SETUP SYSTEM" prompt is displayed (step 634) enabling the user to set the number of cycles per day. The user sets the number of cycles per day after which the number of valve control devices 114 to be cycled and the number of cycles is displayed (step 636) for the user who can confirm the settings or return to the first "SETUP SYSTEM" prompt (step 632). The number of cycles per day corresponds to the value Z, designating how many times during a predetermined time period processor 110 will activate each of the available valve control devices 114.

After the user confirms the number of valve control devices 114 to be simultaneously cycled and the number of cycles per day, the program compares the number of valve controllers available (not overridden) to the number of valves to be cycled (step 638). If the number of valve control devices overridden is greater than the number of valve control devices to be cycled, the "Too Many Valves 'OFF' to Cycle" message (step 640) is displayed and the program loops back to the first "SETUP SYSTEM" prompt (step 632) to enable the user to reset the number of valve control devices 114 to be cycled. Otherwise, the number of valve control devices 114 to be simultaneously cycled and the number of cycles per day is updated (step 642) and the identity of the valve control devices that are activated (being cycled) is displayed (step 644). After the cycle times out (step 646), processor 110 processor updates the valve cycle (step 648) (i.e. incrementing the valve control devices 114 to be cycled) as described above.

In one variation, input devices 118 comprise two contact pushbuttons that are selectively activated to move between prompts, input or change settings and confirm settings. It will be appreciated that other input means such as a touch screen, various different numeric, alphabetic or alphanumeric keypads or keyboards or other types of switches may be utilized.

It is also contemplated that a voice activated device with or without a preprogrammed verbal menu may be utilized.

It will be appreciated by those skilled in the art having the benefit of this disclosure that the apparatus and method described herein provides a continuous-flow irrigation timer that controls the distribution of water between zones with a minimum of user input. It should be understood that the drawings and detailed description herein are to be regarded in an illustrative rather than a restrictive manner, and are not intended to limit the scope of the following claims. On the contrary, further modifications, changes, rearrangements, substitutions, alternatives, design choices, and embodiments apparent to those of ordinary skill in the art, without departing from the spirit and scope of the following claims. Thus, it is intended that the following claims be interpreted to embrace all such further modifications, changes, rearrangements, substitutions, alternatives, design choices, and embodiments.

What is claimed is:

1. An apparatus for controlling an irrigation system having a plurality of irrigation zones, each of the zones having water distribution ducts and a zone valve for selectively providing water to the ducts in response to a control signal, the apparatus comprising:

a processor with associated memory;

a plurality of valve controllers operatively connected to the processor, each of the plurality of valve controllers being selectively activatable by the processor to provide a control signal to a respective zone valve, if connected thereto;

an input device operatively connected to the processor, the input device adapted for inputting to the associated memory first data designating which of the plurality of valve controllers are available for activation, second data designating how many of the available valve controllers are to be activated simultaneously and third data designating how many times during a predetermined time period each of the available valve controllers are to be activated;

a display device operatively connected to the processor for visually displaying information related to the first, second and third data stored in the associated memory;

wherein, initially, the processor uses the first, second and third data to select a valves-to-cycle set containing at least two of the available valve controllers from the plurality of valve controllers, to simultaneously provide control signals to all of the valve controllers in the valves-to-cycle set to activate all of the respective zone valves, and to maintain the control signals until a new valves-to-cycle set is selected;

wherein, continually at a regular interval thereafter, the processor uses the first, second and third data to select a new valves-to-cycle set containing at least two of the available valve controllers from the plurality of valve controllers and including at least one valve controller that was not included in the preceding set, to simultaneously provide control signals to all of the valve controllers in the new set to activate all of the respective zone valves, and to maintain the control signals until another new valves-to-cycle set is selected;

whereby during a predetermined period, each of the available valve controllers is cumulatively activated for an equal amount of time.

2. An apparatus in accordance with claim 1, wherein the input device consists of exactly two momentary contact pushbutton switches.

3. An apparatus in accordance with claim 1, wherein the input device comprises a wired modem for inputting the first, second and third data from a remote location over a PSTN.

4. An apparatus in accordance with claim 1, wherein the input device comprises a wireless modem for inputting the first, second and third data from a remote location over a PLMN cellular network.

5. An apparatus in accordance with claim 1, wherein the input device comprises a RS-232 communications interface for inputting the first, second and third data from a remote location.

6. An apparatus in accordance with claim 1, wherein the input device comprises an Ethernet-type network interface for inputting the first, second and third data from a remote location.

7. An apparatus in accordance with claim 1, wherein the display device comprises an LCD display screen.

8. An apparatus in accordance with claim 1, wherein the valve controllers comprise solid-state AC output modules producing an AC control signal in response to DC digital logic inputs received from the processor.

9. An apparatus in accordance with claim 8, where a separate solid-state AC output module is provided for controlling each zone valve.

10. An apparatus in accordance with claim 9, wherein each valve controller further comprises an over-ride switch having a first position activating the control signal regardless of inputs received from the processor, a second position deactivating the control signal regardless of inputs received from the processor, and a third position allowing the processor to selectively activate and deactivate the control signal.

11. An apparatus for controlling an irrigation system in accordance with claim 1, wherein the processor determines a value for the regular interval between the selection of successive sets of available valve controllers by accessing a lookup table stored in the associated memory using the first, second and third data as table keys.

12. An apparatus for controlling an irrigation system in accordance with claim 1, wherein the processor determines a value for the regular interval between the selection of successive sets of available valve controllers by using an algorithm having the first, second and third data as variables.

13. An apparatus for controlling an irrigation system in accordance with claim 1, wherein the associated memory further comprises:

a valve-status table having memory location addresses corresponding to each valve controller;

status data positions within each memory location address indicative of whether the respective valve controller is available; and a pointer memory location designating a starting address in the valve-status table.

14. An apparatus for controlling an irrigation system in accordance with claim 13, wherein the valves-to-cycle set is selected by the following steps:

continually at a regular interval, incrementing the position of the pointer, and beginning at the position of the pointer, selecting the first N successive memory location addresses having a status data position indicative that the corresponding valve controller is available, where N is the number of available valve controllers to be activated simultaneously obtained from the second data; and assigning the valve controllers corresponding to each memory location in the aforesaid first N successive memory locations to the valves-to-cycle set.

15. An irrigation timer comprising:

a digital processor with associated memory;

a plurality of output modules operatively connected to the digital processor, each output module selectively producing an output signal in response to a digital input signal received from the digital processor;

an input device operatively connected to the digital processor and adapted for inputting to the associated memory
first information designating which of the plurality of output modules are available for activation,
second information designating how many of the available output modules are to be activated simultaneously, and
third information designating how many times during a predetermined time period each of the available output modules are to be activated;

the digital processor repeatedly, at a regular interval selected using the second and third information, selecting a valves-to-cycle set containing at least two of the plurality of output modules designated available for activation by the first information and including at least one output module that was not included in an immediately preceding valves-to-cycle set, sending digital input signals simultaneously to all of the output modules in the valves-to-cycle set, and maintaining the control signals until a new valves-to-cycle set is selected;

whereby during a predetermined period, each of the of the plurality of output modules designated available for activation is cumulatively activated for an equal amount of time.

16. A method for programming an irrigation timer having a processor and associated memory, an input device and a plurality of valve controllers selectively producing an output signal in response to an input signal received from the processor, the method comprising the steps:

inputting to the associated memory using the input device first information designating which of the plurality of valve controllers are available for activation;

inputting to the associated memory using the input device second information designating how many of the available valve controllers are to be activated simultaneously;

inputting to the associated memory using the input device third information designating how many times during a predetermined time period each of the available valve controllers are to be activated;

selecting, at a regular interval using the processor, a valves-to-cycle set containing at least two of the plurality of valve controllers designated available for activation by the first information and including at least one valve controller that was not included in an immediately preceding valves-to-cycle set;

sending input signals simultaneously to all of the valve controllers in the valves-to-cycle set; and maintaining the input signals until a new valves-to-cycle set is selected;

whereby during a predetermined period, each of the of the plurality of valve controllers designated available for activation is cumulatively activated for an equal amount of time.

17. A method for programming an irrigation timer having a processor and associated memory, an input device and a plurality of valve controllers comprising:

selecting from a plurality of valve controllers, each of the controllers controlling a zone valve for supplying water to a zone to be irrigated, a plurality of available valve controllers for actuating the associated zone valves and storing a code in a valve status table in a memory indicating an available status for the selected valves;

selecting a number of valve controllers to be simultaneously actuated and storing the number in the memory;

selecting a number of cycles in a predetermined time period that each of the available valve controllers are to be actuated to operate the associated zone valves and storing the number of cycles in the memory;

using preprogrammed logic with the processor to determine a cycle time for actuating a set of the available valve controllers;

actuating successive sets of valve controllers for the cycle time, each of the sets including at least two of the available valve controllers and at least one valve controller not actuated in the previous cycle; and wherein the available valve controllers are each actuated for an equal amount of time over the predetermined time period.

18. The method of claim 17 wherein processor utilizes the selected number of available valve controllers, the selected number of controllers to be actuated simultaneously, the selected number of cycles in a predetermined time period and preprogrammed logic to determine the cycle time.

19. The method of claim 17 wherein the step of actuating successive sets of valve controllers for the cycle time, each of the sets including at least two of the available valve controllers and at least one valve controller not actuated in the previous cycle, includes populating a valves-to-cycle table in the memory and utilizing the table to determine each set of valve controllers to be actuated in each cycle.

20. The method of claim 19 wherein the step of populating the valves-to-cycle table comprises selecting a predetermined number of available valve controllers from the valve status table stored in the memory.

* * * * *